United States Patent [19]
Wilkins

[11] Patent Number: 5,103,868
[45] Date of Patent: Apr. 14, 1992

[54] SLIDING SLEEVE SEAL FOR USE IN FLUID COUPLING DEVICES

[75] Inventor: Steven Wilkins, Union City, Pa.
[73] Assignee: Snap-Tite, Inc., Erie, Pa.
[21] Appl. No.: 659,034
[22] Filed: Feb. 21, 1991
[51] Int. Cl.$^5$ ............................................. F16L 37/28
[52] U.S. Cl. ................................ 137/614.03; 251/900
[58] Field of Search ............................ 137/614.03, 614; 251/900; 277/173, 177

[56] References Cited

U.S. PATENT DOCUMENTS 2,854,259  9/1958  Clark ............................ 137/614.03

FOREIGN PATENT DOCUMENTS 167793  6/1956  Australia ............................ 251/900
2826344  12/1979  Fed. Rep. of Germany ...................... 137/614.03

Primary Examiner—A. Michael Chambers
Attorney, Agent, or Firm—Woodling, Krost & Rust

[57] ABSTRACT

In a coupling including female and male coupler means for longitudinally coupling and uncoupling to provide a longitudinal fluid passage therethrough, the passage having at least one check member disposed in the through passage, which check member is moved from the blocked and unblocked positions by the uncoupling and coupling of the couplers, a valve member being resiliently biased to a blocked position and having a gasket, sealing member to seal against fluid loss, the improvement comprising a gasket support comprising concentric sleeves which define a variable channel for holding the sealing member and which move independently of each other and where when the check member is in the blocked and unblocked positions the gasket member is subjected to axial compression and into a sealing relationship and when the check member in between the blocked and unblocked positions the axial compression is relieved.

12 Claims, 4 Drawing Sheets

SLIDING SLEEVE SEAL FOR USE IN FLUID COUPLING DEVICES

BACKGROUND OF THE INVENTION

The present invention relates generally to high-pressure hydraulic couplings, comprised of male and female parts, and more particularly to a sliding sleeve seal for use in conjunction with the means for closing and opening the through passage in the coupler when the female and male parts are disengaged.

Numerous designs for fluid couplers have been developed which include male and female coupler parts which when brought together will automatically disengage a valve or check member to unblock a through passage in the coupler parts and allow fluid to flow from its source through the coupling and to its use. In these designs, a resilient bias means, e.g. a spring, provides an axial bias which forces the valve or check member in the fluid through passage back into the closed position to shut off fluid flow through the coupler when the male and female coupling is disengaged.

Examples of designs for fluid couplers where the connection of the male and female coupler parts will automatically move the blocking means or check member from the blocked position to the unblocked position thereby allowing fluids to be moved through the fluid passage include, for example, U.S. Pat. No. 4,249,572 to A. Z. Shindelar, U.S. Pat. No. 4,470,575 issued to Kurt Stoll, U.S. Pat. No. 3,348,575 issued to F. J. Simak, and U.S. Pat. No. 3,023,030 issued to J. Torres.

In designing the support sleeve for the resiliently biased member, often times, a sealing means such as a gasket ring is employed between the spring support means and the inside wall of the coupler to seal off fluid paths which would result in leaks and the loss of fluid. Delays in the check member moving into the closed position can occur when the parts are uncoupled if the resilient gasket ring material which has been forced against the inside wall in sealing relationship, hangs-up or catches against the inside wall. This may occur because, while the coupler is in use, the gasket material being compressed against the inner guide wall may be forced into the imperfections in the wall so the gasket material remains momentarily adhered to the wall and is slow to release from its engagement with the wall surface.

SUMMARY OF THE INVENTION

The present invention resulted from the discovery that the use of a split or sliding sleeve structure for supporting the gasket member allows the gasket member to be released more readily from contact with the inside wall. In operation, the parts which comprise the sliding sleeve will separate and release some of the pressure holding the gasket material in place and consequently allow a faster release of the gasket member from contact with the coupler wall. Thus, the valve or check member slides more readily back into its blocking position to block the through passage in the coupler, and shut off the flow of fluid.

DESCRIPTION OF THE PREFERRED EMBODIMENT

Figure 1:
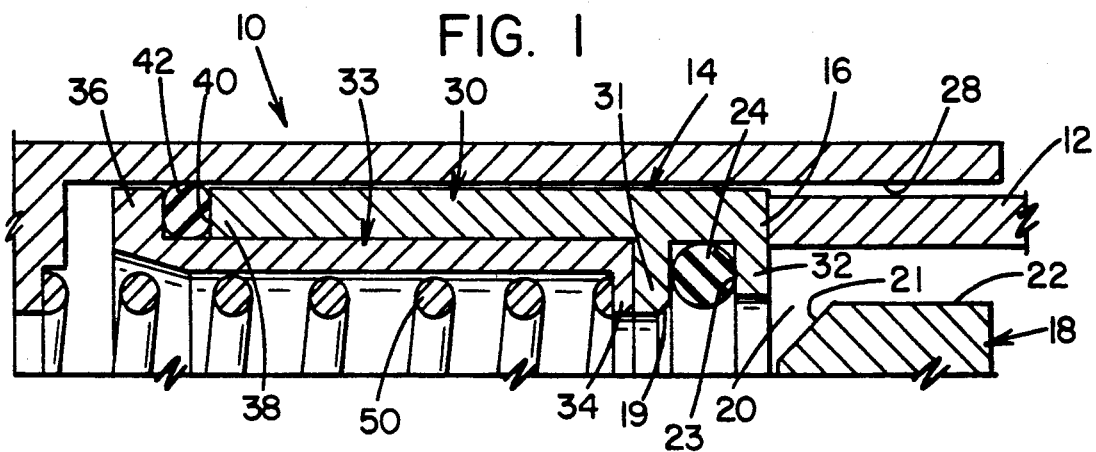
FIG. 1 is a longitudinal, cross-section through part of a female coupler part and a sliding sleeve seal showing part of a male coupler part in place and the check member in the open or unblocked position allowing fluid to pass therethrough.

Referring now to FIG. 1 of the drawings, there is shown, in part, a female coupler part 10 in combination with a sleeve member 12, of a male coupler part, in contact with a sliding sleeve seal 14. All of the parts of the male and female couplers have not been shown since the couplers per se are not part of the present invention and are not necessary to an understanding thereof. Further, although the invention will be described as part of a female coupler, it could be employed in a male coupler if the resilient mechanism required a seal between it and the inner coupler wall to prevent fluid loss therethrough. The female and male couplers are also referred to as coupler and nipple arrangements.

The insertion of a male coupler into the female coupling causes the sleeve member 12 to contact the flanged end 16 of sliding sleeve seal 14 and move sliding sleeve seal 14 longitudinally out of sealing contact with a valve or check member 18, which is part of female coupler 10, and open a fluid passage 20 between contact surfaces 19 and 21 on flange 31 of sleeve 30 and member 18, respectively, and to unblock seal 24, which is a resilient gasket ring or the like, from valve seat 22 on valve member 18. The blocked or closed relationship is best seen in FIG. 3 which shows contact surfaces 19 and 21 in abuting relationship and seal 24 in contact with valve seat 22.

The sliding sleeve seal 14 comprises two concentric, radially spaced cylindrical sleeves 30 and 33 which are free to move relative to each other and along inner or guide wall 28, which is shown as the bore wall of female coupler 10. The outer sleeve 30 has first and second ends, and the first end has two radially inward flanged portions 31 and 32 at a first end thereof which together define a groove or channel 23 to hold seal 24 which provides the sealing contact with check member 18 via valve seat 22 (see also FIG. 3). The inner sleeve 33 also has first and second ends, with a radially inwardly extending flanged portion 34 at the first end thereof shown in mating engagement with flange 31 of the outer sleeve 30, although it is not critical to the invention for them to be in mating relationship. The second end of the inner sleeve 33 has a radially outward extending flange 36 which in conjunction with the second end 38 of the outer sleeve 30 define a variable groove or channel 40 which holds a resilient gasket ring (or O-ring) 42 in sealing relationship against the inner or guide wall 28 of the female coupler and prevents fluid escape along bore wall 28.

Figure 2:
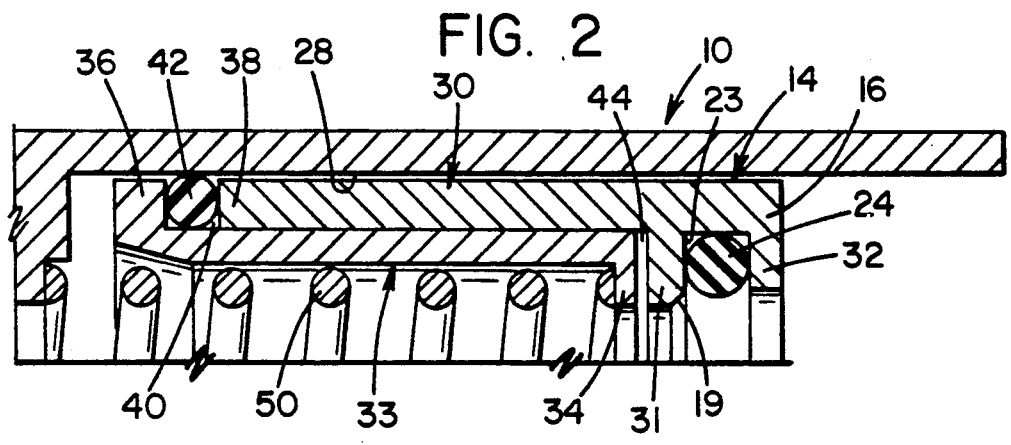
FIG. 2 is another sectional view of the sleeve of FIG. 1, with the pressure on the gasket member relieved.

In operation, when the coupler members are engaged to complete the coupling and to unblock the through fluid passage, the gasket ring 42 is compressed by a combination of sleeve member 12 of the male coupler forcing the outer sleeve 30 axially or longitudinally inward into the female coupler, which force is opposed by a resilient bias member such as spring 50 which presses against flange 34. Consequently, this action causes ring 42 to expand radially to seal against wall 28. When the sleeve member 12 of the male coupler is removed, spring 50 will force sliding sleeve seal 14 to move longitudinally and force the seal 24 back into contact with seat 22 of valve 18, as seen in FIG. 3. Once the male member is removed, the fact that the inner sleeve 33 and outer sleeve 30 of the sliding sleeve seal 14 are not fixed will allow them to move axially or longitudinally relative to each other, thus widening channel 40 and relieving the pressure on the gasket ring 42. As seen in FIG. 2, a gap 44 may occur between flanges 31 and 34 as sleeves 30 and 33 slide past one another. Since the pressure is relieved from the gasket ring, it retracts from engagement with bore wall 28 and the sleeve seal is freer to move under the pressure of the spring 50 and move seal 24 into sealing engagement with surface 22 of valve member 18.

Figure 3:
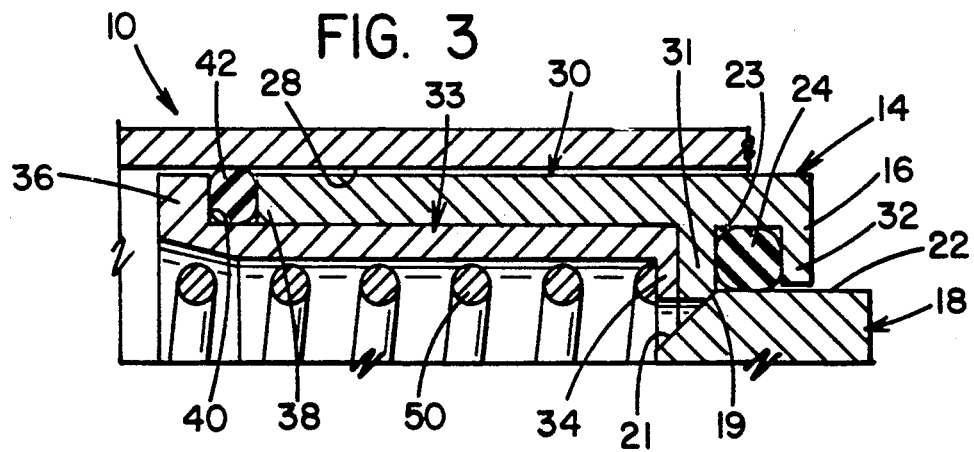
FIG. 3 is a sectional view of the female coupler in the closed or blocked position.
Figure 4:
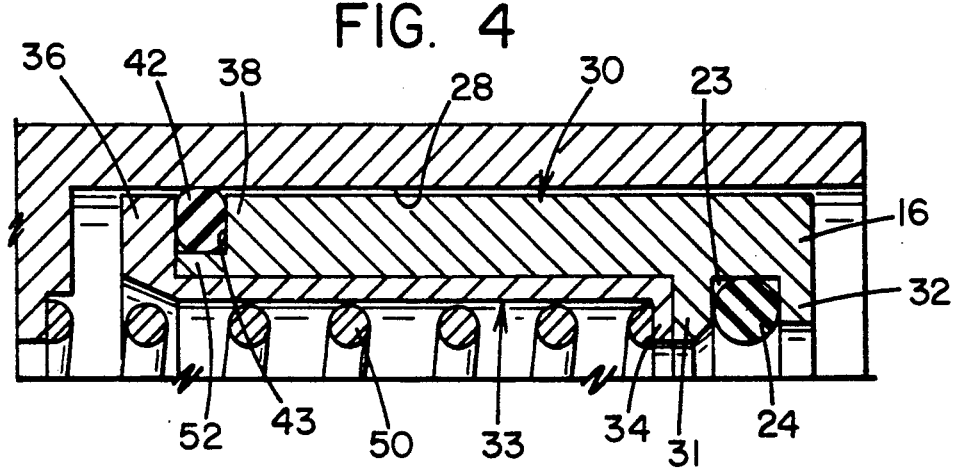
FIGS. 4 and 5 are of an alternative design of the sliding sleeve seal similar to that shown in FIGS. 1 and 2.
Figure 5:
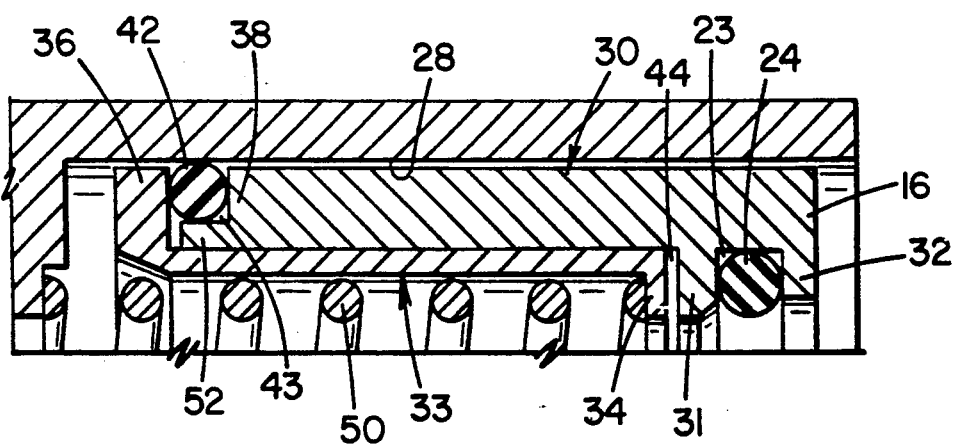

FIGS. 4 and 5 illustrate another embodiment of the sliding sleeve seal shown in FIGS. 1, 2 and 3. As shown in FIGS. 4 and 5, the difference in this embodiment is that the outer sleeve 30 has an additional flange portion 52 which extends longitudinally from a portion of end 38 of outer sleeve 30. The longitudinal flange 52 along with flange 36 and end 38 defines a channel 43, and flange 52 will serve to engage gasket ring 42 to exert additional radial pressure on the gasket ring 42 forcing it into contact with inner wall 28 and provide for additional sealing security.

Figure 6:
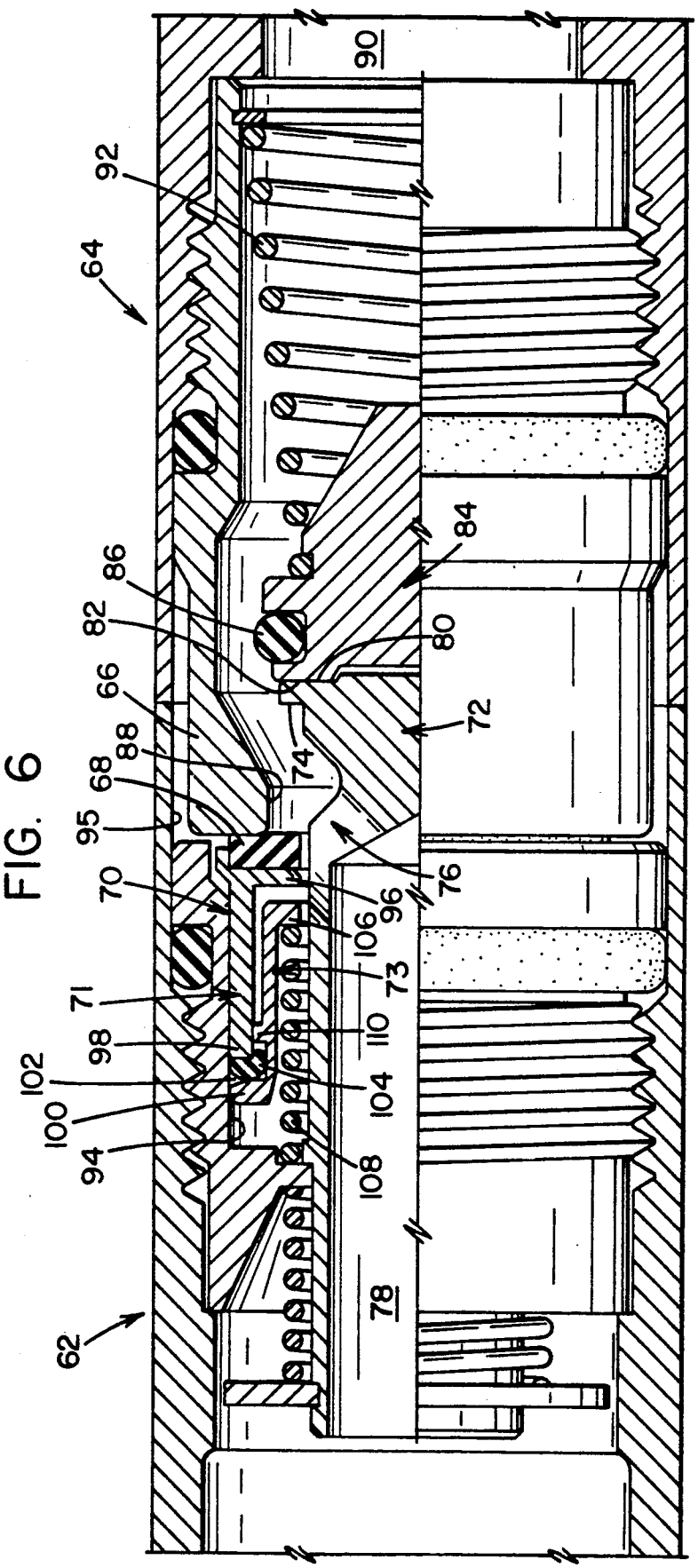
FIG. 6 is a sectional view of another design of the sliding sleeve seal shown in part of a female coupler part engaged with a male coupler part and illustrating a through passage.
Figure 7:
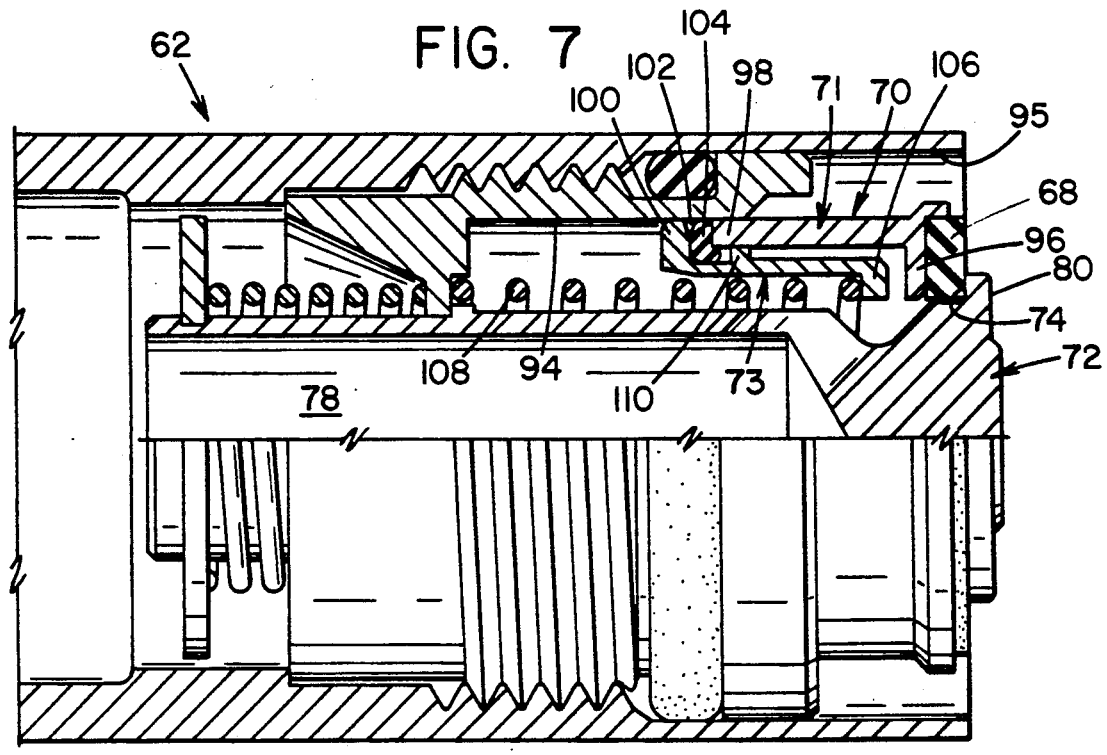
FIG. 7 is a sectional view of the female coupler shown in FIG. 6 in the closed position.

FIGS. 6 and 7 show yet another embodiment of the present invention, which is the preferred embodiment, with FIG. 6 showing a coupling so that the male and female couplers are in the open position and FIG. 7 showing the female coupler in the closed position.

As shown in FIG. 6, female coupler 62 is engaged with male coupler 64. In doing so, sleeve 66 of male coupler 64 will engage resilient seal 68, which is a resilient annular washer or the like, and move sleeve 70 axially or longitudinally into the female coupler 64 and out of engagement with valve member 72 (as seen in FIG. 7). In the closed position, seal 68 will engage valve seat 74 to shut-off fluid flow through the female coupler. In the open position, the disengagement of seal 68 from valve seat 74 will create a fluid passage 76, which communicates with fluid passage 78 in female coupler 64.

The coupling will also result in surface 80 of valve member 72 of female coupler 62 engaging surface 82 of valve member 84 of male coupler 64 and force valve member 84 axially or longitudinally into male coupler 64 unseating seal 86 from seat 88 on sleeve 66. Thus fluid passage 78 in female coupler will communicate with fluid passage 90 in male coupler 64 via passage 76. When disengaged, spring 92 will force valve member 84 back to the closed position with seal 86 in sealing engagement with seat 88.

In the sleeve seal design shown in FIGS. 6 and 7, sleeve 70 comprises two concentric sleeves 71 and 73, each having a first and second end. In this design the sleeve seals against guide wall 94, instead of the inside wall 95 of female coupler 62 which generally defines the axial passage 78.

The first end of outer sleeve 73 has an inwardly extending flange 96 which engages and supports seal 68. The second end 98 of sleeve 73, along with flange 100 which extends radially outward from inner sleeve 73, define a groove or channel 102 which holds seal 104, a resilient gasket ring, O-ring, or like resilient annular seal, in sealing relationship with inner guide wall 94. The first end of inner sleeve 73 has a flange 106 which extends radially inward therefrom and engages resilient bias member 108, which is a spring or the like, by which seal 68 is biased to the closed position (FIG. 7) when the coupling is disengaged. Extending from the surface of inner sleeve 73, is a flange 110, which spaces apart inner sleeve 73 and outer sleeve 71.

Since sleeves 71 and 73 are free to move axially relative to one another, similar to the embodiment shown in FIGS. 1 and 3, when the coupler is in the open position, resilient bias member 108 will apply force in one direction and will be opposed by the force of sleeve 66. Thus, seal 104 will be forced to expand radially into sealing engagement with wall 94. Similarly, when the coupler is closed, resilient bias member 108 will force seal 68 into sealing engagement with valve seat 74, again forcing seal 104 to expand radially.

In between the open and closed positions, sleeves 71 and 73 can move axially relative to each other allowing channel 102 to enlarge and reducing the pressure on seal 104. So, seal 104 is freer to disengage from wall 94. Flange 110 will allow end 98 of sleeves 71 to apply pressure to seal 104 and force it to expand radially into sealing contact.

Figure 8:
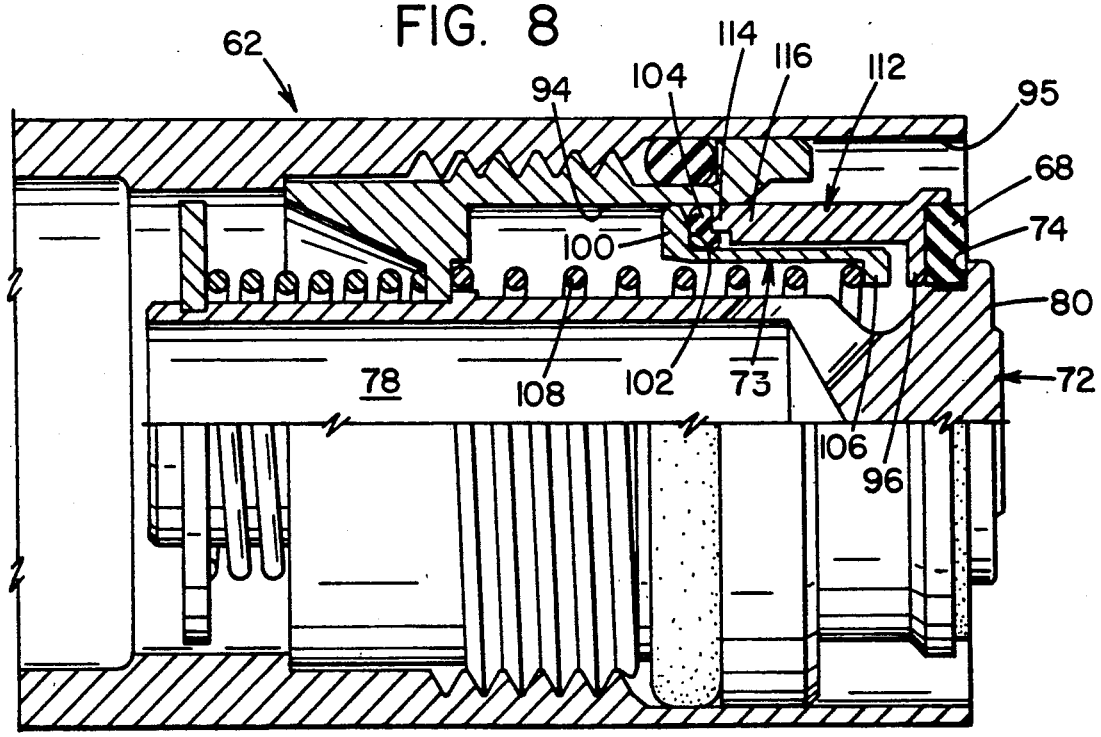
FIG. 8 is a sectional view similar to FIG. 7, with the outer sleeve of the sliding sleeve seal modified to illustrate another embodiment of the invention.

FIG. 8 shows a female coupler 62 similar to that shown in FIG. 7 except that outer sleeve 71 has been replaced with outer sleeve 112 which has a flange 114 extending axially from end 116 of the sleeve to apply pressure to seal 104 and force it to expand radially into sealing contract with wall 94.

While the invention has been described in conjunction with specific embodiments, it is to be understood that many alternatives, modifications and variations will be apparent to those skilled in the art in light of the foregoing description. Accordingly, it is intended all such alternatives, modifications, and variations which fall within the spirit and scope of the appended claims.

What is claimed is:

1. In a coupling including female and male coupler means for longitudinal coupling and uncoupling to provide a longitudinal fluid passage therethrough, said passage having at least one check member disposed in the through passage, which said check member is moved from the blocked and unblocked positions upon uncoupling and coupling of said couplers, said check member being resiliently biased to a blocked position and having a seal means for sealing against fluid loss, the improvement comprising a seal support comprising inner and outer concentric sleeves with the inner sleeve being slidably received within said outer sleeve, said concentric sleeves defining a variable channel for holding the seal means and which move independently of each other whereby when the check member is in the blocked and unblocked positions, the sealing means is subjected to axial compression and into a sealing relationship and when the check member is between the blocked and unblocked positions said sealing means is released from axial compression.

2. The coupling of claim 1 wherein said seal means comprises a resilient gasket.

3. The coupling of claim 1 wherein said seal means comprises a resilient O-ring.

4. The coupling of claim 1 wherein the inner sleeve has a radially outwardly extending flange at one end which acts in conjunction with an end of the outer sleeve to define said variable channel and to provide said axial compression on said seal.

5. The coupling of claim 1 wherein said outer sleeve further has an axially extending flange which along with the end of said outer sleeve defines said variable channel and urges said seal means into sealing contact with an inside wall of said female coupling means.

6. The coupling of claim 1 wherein said inner sleeve further has an outwardly extending flange to radially space said outer sleeve from said inner sleeve to thereby urge said seal means into sealing contact with an inside wall of said female coupling means.

7. A seal support for use in a fluid coupling device comprising inner and outer concentric sleeves each having first and second ends with the inner sleeve being slidably received within said outer sleeve, said concentric sleeves being free to move independently, each having means at the first end defining a support means for holding a resilient sealing member in sealing relationship, and each having means at the second end which is receptive to an axial force whereby said sleeves can be forced together axially when the coupling device is coupled or uncoupled while being free to separate axially otherwise.

8. The seal support of claim 7 wherein said means receptive to axial force comprise radial flange members.

9. The seal support of claim 7 wherein said means for holding comprises a radial flange member on the first end of the inner sleeve and the first end of the outer sleeve.

10. The seal support of claim 7 wherein said means for holding further includes a flange member on the first end of the outer sleeve extending axially from said first end.

11. The seal support of claim 7 wherein said inner sleeve further has a flange extending outwardly from the surface thereof whereby said inner and outer sleeves are spaced apart.

12. In a coupler including male and female coupler members adapted to be connected and disconnected by relative axial movement therebetween and having wall means defining an axial passage therebetween, a valve member in the passage movable between open and closed positions and being resiliently biased to closed position, connection of the coupler members causing the valve member to be moved to an open position against its resilient biasing, the improvement of sliding seal means for sealing against fluid leakage along the wall means defining the axial passage, including in combination first and second relatively axially movable concentric sleeves with the inner sleeve being slidably received within said outer sleeve, said concentric sleeves each having opposed first and second end portions and located in the axial passage, groove defining wall means on said first end portions of said first and second concentric sleeves defining a variable size groove in an axial direction, an annular resilient sealing member in said variable size groove, abutment wall means on said second end portions of said first and second concentric sleeves for causing axial movement of said first and second sleeves in a first axial direction, first resilient means urging said first and second concentric sleeves in a second axial direction, connection of the male and female coupler members causing the male coupler member to urge said first and second concentric sleeves to move in said first axial direction and relative axial movement of said first and second concentric sleeves reducing the size of said variable groove in an axial direction causing said resilient sealing member to expand radially into sealing engagement with the wall means to prevent fluid leakage therealong.

* * * * *